(12) United States Patent
Tirone, III et al.

(10) Patent No.: US 8,794,923 B2
(45) Date of Patent: Aug. 5, 2014

(54) GAS TURBINE ENGINE ROTOR TIE SHAFT ARRANGEMENT

(75) Inventors: John P. Tirone, III, Moodus, CT (US); Daniel Benjamin, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 622 days.

(21) Appl. No.: 12/916,010

(22) Filed: Oct. 29, 2010

(65) Prior Publication Data
US 2012/0107098 A1  May 3, 2012

(51) Int. Cl.
 F01D 5/06 (2006.01)
(52) U.S. Cl.
 USPC ..................................... 416/198 A
(58) Field of Classification Search
 CPC ........... F01D 5/025; F01D 5/026; F01D 5/06; F01D 5/066
 USPC ...... 415/66, 122.1, 199.4; 416/170 R, 198 A, 416/198 R, 204 A
 See application file for complete search history.

(56) References Cited

U.S. PATENT DOCUMENTS

| | | | |
|---|---|---|---|
| 4,965,994 A | 10/1990 | Ciokajlo et al. | |
| 5,267,397 A | 12/1993 | Wilcox | |
| 5,537,814 A | 7/1996 | Nastuk et al. | |
| 7,175,385 B2 * | 2/2007 | Aschenbruck et al. | 415/107 |
| 7,452,188 B2 | 11/2008 | Bouchard | |
| 2007/0020090 A1 | 1/2007 | Giaimo et al. | |
| 2007/0020091 A1 | 1/2007 | Giaimo et al. | |
| 2007/0020092 A1 | 1/2007 | Giaimo et al. | |
| 2007/0020093 A1 | 1/2007 | Giaimo et al. | |
| 2007/0020094 A1 | 1/2007 | Giaimo et al. | |
| 2010/0244446 A1 | 9/2010 | Qu et al. | |
| 2011/0219781 A1 * | 9/2011 | Benjamin et al. | 60/796 |

FOREIGN PATENT DOCUMENTS

WO    WO2007/051443    *    5/2007

OTHER PUBLICATIONS

Klingels, Turbomachine having a Tie Rod consisting of Tension and compression sleeves, May 10, 2007, Machine translation of WO2007/051443.*
Klingels, Turbomachine having a tie rod consisting of tension and compression sleeves, May 10, 2007, translation of WO2007051443(A1).*

* cited by examiner

*Primary Examiner* — Ned Landrum
*Assistant Examiner* — Liam McDowell

(57) ABSTRACT

Independent axial preloading of compressor and turbine disks in a gas turbine engine rotor is achieved by a dual tie shaft arrangement wherein a forward tie shaft engages forward and aft portions of a compressor hub within which the compressor disks are disposed to axially and compressively preload the compressor disks between the forward and aft portions of the compressor hub. An independent tie shaft engages an aft portion of a turbine hub within which turbine disks are disposed and an aft portion of the compressor hub to axially and compressively preload the turbine disks between the turbine and compressor hubs.

15 Claims, 2 Drawing Sheets

GAS TURBINE ENGINE ROTOR TIE SHAFT ARRANGEMENT

BACKGROUND OF THE INVENTION

1. Technical Field

This invention relates generally to gas turbine engines and particularly to a tie shaft arrangement for gas turbine engine rotors.

2. Background Information

Gas turbine engines such as those which power aircraft and industrial equipment employ a compressor to compress air which is drawn into the engine and a turbine to capture energy associated with the combustion of a fuel-air mixture which is exhausted from the engine's combustor. The compressor and turbine of the engine typically comprise a multiplicity of airfoil blades which are mounted on a plurality of disks. The compressor disks and blades are rotationally driven by rotation of the engine's turbine. It is a well-known practice to employ longitudinal tie shafts to react the aerodynamic loading of the turbine and compressor blades by air and combustion gases acting thereon. It is a well-known prior art practice to employ a single tie shaft to axially couple the compressor and turbine bladed disks. As part of the tie shaft's function of reacting longitudinal aerodynamic loads on the compressor and turbine blades, the tie shaft must axially maintain axial preloads of the compressor and turbine disks. However, due to the extreme differences in aerodynamic loading of the compressor blades and turbine blades, the axial preloading requirements of compressor and turbine disks are extremely different and therefore, optimally preloading compressor and turbine bladed disks with a single tie shaft are difficult to achieve. Accordingly, there exists a need for a gas turbine engine rotor tie shaft arrangement wherein bladed disks of the engine's compressor and turbine may be independently axially preloaded to optimum levels.

SUMMARY OF THE DISCLOSURE

In accordance with the present invention, a gas turbine engine rotor employs dual independent tie shafts for independently axially preloading compressor and turbine disks to optimum levels. A forward tie shaft extending through a hub in which the compressor bladed disks are mounted longitudinally and compressively preloads the compressor hub for compressive preloaded retention of the compressor bladed disks between forward and aft portions of the compressor hub. An aft tie shaft which is independent of the forward tie shaft extends through a turbine hub in which the bladed turbine disks are mounted and engages the aft end of the turbine hub and an aft end of the compressor hub to compressively preload the turbine disks between an aft end of the compressor hub and an aft end of the turbine hub.

DETAILED DESCRIPTION OF THE INVENTION

Figure 1:
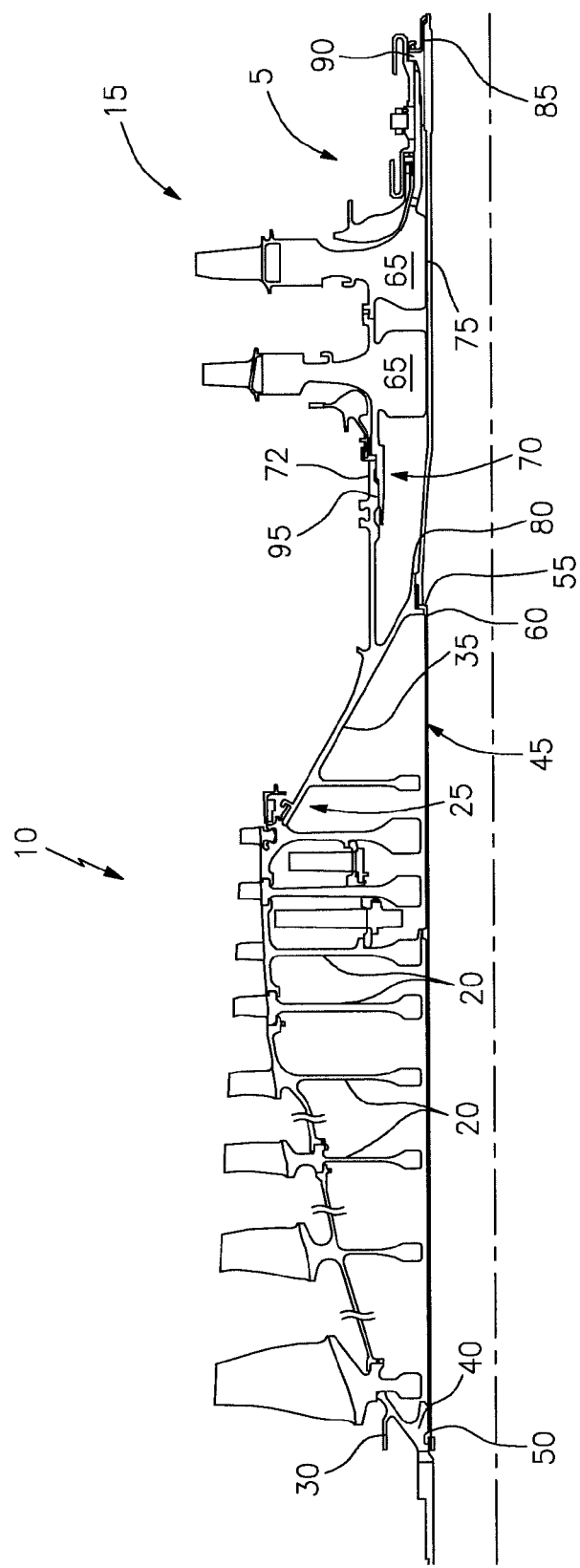
FIG. 1 is a side elevation of a gas turbine engine rotor employing the dual tie shaft arrangement of the present invention having forward and aft portions.

Referring to FIG. 1, a gas turbine engine rotor shown generally at 5 comprises a compressor section 10 and a downstream turbine section 15 in longitudinal serial flow relationship. Compressor section 10 includes a longitudinal stack of juxtaposed bladed compressor disks 20 disposed within a hub 25 comprising forward and aft portions 30 and 35, which compressively retain (clamp) the disks therebetween. Forward compressor hub portion 30, also known in the art as a forward stub shaft, is threaded at a forward end 40 thereof. A forward tie shaft 45 which is itself threaded at a forward end 50 thereof extends through compressor hub 25 engaging forward stub shaft 30 by threaded engagement of threaded forward end of forward tie shaft 45 with threaded forward end 40 of front stub shaft 30. Aft end of forward tie shaft 45 is provided with a radially outwardly extending flange 55 which abuts a mating flange 60 at the aft end of aft end portion 35 of compressor hub 25. Threaded engagement of the forward end of forward tie shaft 45 with threaded forward end 40 of front stub shaft 30 causes abutment of flanges 55 and 60 on forward tie shaft 45 and aft end portion 35 of hub 25 thereby compressively retaining the stack of bladed disks 20 between front stub shaft 30 and aft end portion 35 of hub 25 and compressively preloading disks 20 within hub 25.

Turbine portion 15 of rotor 5 comprises a longitudinal stack of bladed turbine disks 65 juxtaposed with respect to one another between forward and aft ends of turbine hub 70. The forward portion of turbine hub 70 comprises a forward extension of a medial portion of the forwardmost turbine disk 65 and abuts the aft end of compressor hub 25 at 72. The aft end of turbine hub 70 comprises an aft extension of a medial portion of the aftmost bladed turbine disk 65. A forward end 80 of rear tie shaft 75 is threaded and engages a threaded aft end of aft end portion 35 of compressor hub 25. Aft end 85 of rear tie shaft 75 is threaded and receives a threaded aft nut 90 thereon. Nut 90 abuts the aft end of turbine hub 70 so that when threaded forward end 80 of aft tie shaft 75 is threaded into aft end portion 35 of compressor hub 25, the bladed turbine disks are compressively retained and preloaded within turbine hub 70 between the turbine hub and aft end portion 35 of compressor hub 25.

Accordingly, it will be seen that the compressive preloaded retention of bladed compressor disks 20 between the forward and aft end portions of compressor hub 25 is achieved independently of the compressive preloaded retention of bladed turbine disks 65 and turbine hub 70, the preloading of compressor disks 20 within compressor hub 25 being determined by the extent to which the forward end of forward tie shaft 45 is threaded into the forward end portion of the compressor hub and the amount of preloading of bladed turbine disks 65 being determined by the extent of the threaded engagement of rear nut 90 on threaded end 85 of aft tie shaft 75. As set forth hereinabove, forward and rear tie shafts 45 and 75 react axial aerodynamic loading of the compressor and turbine bladed disks. The compressor and turbine portions of rotor 5 are rotationally coupled at a splined connection 95 of aft end portion 35 of compressor hub 25 and a forward end of turbine hub 70.

Figure 2:
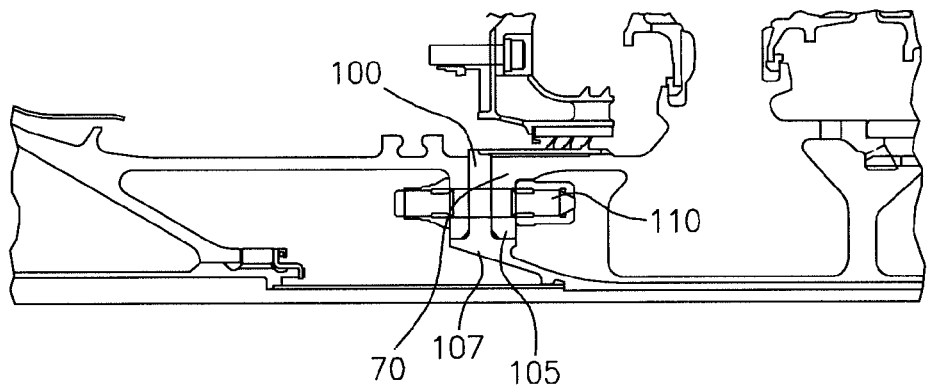
FIG. 2 is a side elevation of a gas turbine engine rotor employing a first alternate embodiment of the dual tie shaft arrangement of the present invention.

Referring to FIG. 2, aft end portion 35 of compressor hub 25 is provided with a radially inwardly extending flange 100 which abuts a mating radially outwardly extending flange 107 at the forward end of aft tie shaft 75 which abuts another mating radially inwardly extending flange 105 at the forwardmost end of turbine hub 70. The three mounting flanges 100, 107 and 105 are provided with mating holes which receive through-bolts 110 which connect the compressor and turbine hubs where the maximum difference in axial loading of the turbine and compressor occurs and for transmission of driving torque from the turbine hub to the compressor hub whereby the rotation of bladed turbine disks 65 in response to working fluid flowing through the turbine will rotationally drive the compressor bladed disks 20 for compression of air drawn into the engine, which, after compression, is exhausted to the engine's combustor (not shown). Tie shaft 75 then extends to the rear turbine disk hub similar to FIG. 1. with a reduced stack load requirement allowed by bolts 110.

Figure 3:
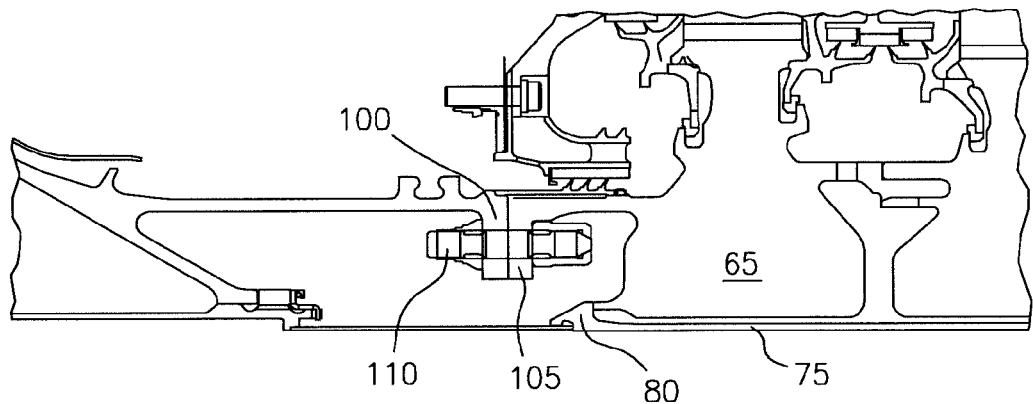
FIG. 3 is a side elevation of a gas turbine engine rotor employing a second alternate embodiment of the dual tie shaft arrangement of the present invention.

Bolts 110 reduce the amount of disk preloading required of the tie shafts for accommodation of axial loading of the turbine and compressor disks by working fluid flowing through the engine. Referring to FIG. 3, aft end portion 35 of compressor hub 25 is provided with a radially inwardly extending flange 100 which abuts a mating radially inwardly extending flange 105 at the forwardmost end of turbine hub 70. The two mounting flanges 100 and 105 are provided with mating holes which receive through-bolts 110 which connect the compressor and turbine hubs where the maximum axial load delta occurs and for transmission of driving torque from the turbine hub to the compressor hub whereby the rotation of bladed turbine disks 65 in response to working fluid flowing through the turbine will rotationally drive the compressor bladed disks 20 for compression of air drawn into the engine, which, after compression, is exhausted to the engine's combustor (not shown). Tie shaft 75 is coupled to the aft turbine disk hub as in FIG. 1.

Figure 4:
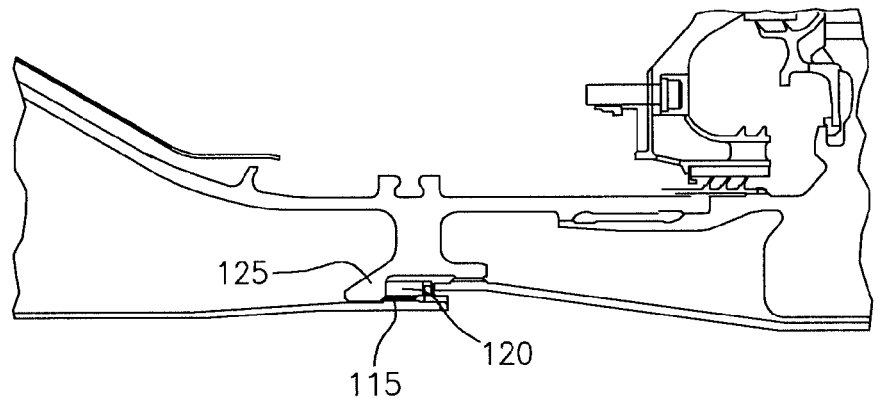
FIG. 4 is a side elevation of a gas turbine engine rotor employing a third alternate embodiment of the dual tie shaft arrangement of the present invention.

Bolts 110 reduce the amount of disk preloading required of the tie shafts for accommodation of axial loading of the turbine and compressor disks by working fluid flowing through the engine. Referring to FIG. 4, an alternate arrangement for the engagement of the aft end of forward tie shaft 45 with the aft end portion 35 of compressor hub 25 is shown. In this embodiment, aft end of forward tie shaft 45 is threaded at threaded aft end 115. A forward nut 120 is threaded onto threaded aft end 115 of forward tie shaft 45 and abuts radially inwardly extending flange 125 at the aft end of aft end portion 35 compressor hub 25. The abutment of forward nut 120 with flange 125 on compressor hub aft end portion 35 fixes the threaded engagement of the threaded forward end of forward tie shaft 45 with the threaded portion of front stub shaft 30. Thus, it will be appreciated that the dual tie shaft arrangement of the gas turbine engine rotor of the present invention defines independent axial load paths from the compressor and turbine disks through the forward and aft tie shafts which enables independent preloaded retention of the compressor bladed disks and the turbine bladed disks. Therefore, axial aerodynamic loading of the turbine blades which is opposite the axial aerodynamic loading of the compressor blades can be accommodated without excessive preloading of the compressor disks.

While specific embodiments of the present invention have been shown and described herein, it will be understood that various modifications of these embodiments may suggest themselves to those skilled in the art. For example, while specific geometries of the turbine and compressor hubs have been shown and described, it will be appreciated that the dual tie shaft arrangement of the gas turbine engine rotor of the present invention is not limited to these particular geometries. Accordingly, various other turbine and compressor hub geometries may be employed without departing from the present invention. Similarly, while specific numbers of compressor and turbine bladed disks have been illustrated, it will be appreciated that the dual tie shaft gas turbine engine rotor arrangement of the present invention may be employed with any number of compressor and turbine bladed disks as will be determined by the performance requirements of the gas turbine engine in which the present invention is employed. Accordingly, it will be understood that these and various other modifications of the preferred embodiments of the present invention as illustrated and described herein may be employed without departing from the present invention and it is intended by the appended claims to cover these and any other such modifications which fall within the true spirit and scope of the invention herein.

Having thus described the invention, what is claimed is:

1. A gas turbine engine rotor, comprising:
an upstream axial flow compressor and a downstream turbine in longitudinal serial flow relationship;
the compressor comprising a compressor hub having a forward end portion and an aft end portion and at least one bladed compressor disk disposed within the compressor hub between and in engagement with the forward end portion and the aft end portion thereof;
the gas turbine engine rotor further comprising a forward tie shaft extending through and engaging the compressor hub at the forward end portion and the aft end portion thereof to longitudinally and compressively preload the compressor hub for compressive preloaded retention of the at least one bladed compressor disk between the forward end portion and the aft end portion of the compressor hub;
the turbine comprising a turbine hub having a forward end portion and an aft end portion and at least one bladed turbine disk disposed within the turbine hub between and in engagement with the forward end portion and the aft end portion thereof;
the gas turbine engine rotor further comprising an aft tie shaft independent of the forward tie shaft, the aft tie shaft engaging the compressor hub at the aft end portion thereof, and
the aft tie shaft engaging the turbine hub at the aft end portion thereof to longitudinally and compressively preload the turbine hub for compressive retention of the at least one bladed turbine disk between the aft end portion of the turbine hub and the aft end portion of the compressor hub wherein a first axial load path is defined from the at least one bladed compressor disk through the forward tie shaft, wherein a second axial load path is defined from the at least one bladed turbine disk through the aft tie shaft, and wherein the first axial load path and the second axial load path are independent, enabling independent preloaded retention of the at least one bladed compressor disk and the at least one bladed turbine disk.

2. The gas turbine engine rotor of claim 1 wherein the at least one bladed compressor disk comprises a longitudinal stack of juxtaposed bladed compressor disks.

3. The gas turbine engine rotor of claim 1 wherein the at least one bladed turbine disk comprises a longitudinal stack of juxtaposed bladed turbine disks.

4. The gas turbine engine rotor of claim 1 wherein the forward tie shaft engages the forward end portion of the compressor hub at a threaded connection therewith.

5. The gas turbine engine rotor of claim 1 wherein the forward tie shaft is provided at an aft end thereof, with a radially outwardly extending flange, the forward tie shaft engaging the aft end portion of the compressor hub by abutment of the forward tie shaft flange with the aft end portion of the compressor hub.

6. The gas turbine engine rotor of claim 1 wherein the forward end portion of the compressor hub comprises a hollow forward stub shaft.

7. The gas turbine engine rotor of claim 1 wherein the turbine hub comprises a forward extension and an aft extension of a medial portion of the at least one bladed turbine disk.

8. The gas turbine engine rotor of claim 1 wherein the aft tie shaft engages the aft end portion of the compressor hub at a threaded connection therewith.

9. The gas turbine engine rotor of claim 1 wherein the aft tie shaft is threaded at an aft end thereof, the gas turbine engine rotor further including an aft nut threaded on the aft end of the aft tie shaft, the aft tie shaft engaging the aft end portion of the turbine hub by abutment of the aft nut with the aft end portion of the turbine hub.

10. The gas turbine engine rotor of claim 1 wherein the forward end portion of the turbine hub is coupled to the aft end portion of the compressor hub for transmission of rotational driving torque from the turbine to the compressor.

11. The gas turbine engine rotor of claim 10 wherein the forward end portion of the turbine hub is coupled to the aft end portion of the compressor hub by a splined coupling therewith.

12. The gas turbine engine rotor of claim 1 wherein the forward tie shaft is externally threaded at an aft end thereof, the gas turbine engine rotor further including a forward nut threaded on the aft end of the forward tie shaft, engaging the aft end portion of the compressor hub by an abutment of the forward nut with the aft end portion of the compressor hub.

13. The gas turbine engine rotor of claim 12 wherein the aft end portion of the compressor hub is provided with a radially inwardly extending flange, the forward tie shaft engaging the aft end portion of the compressor hub by abutment of the forward nut with the radially inwardly extending flange of the aft end portion of the compressor hub.

14. A gas turbine engine rotor, comprising:
an upstream axial flow compressor and a downstream turbine in longitudinal serial flow relationship;
the compressor comprising a compressor hub having a forward end portion and an aft end portion and at least one bladed compressor disk disposed within the compressor hub between and in engagement with the forward end portion and the aft end portion thereof;
the gas turbine engine rotor further comprising a forward tie shaft extending through and engaging the compressor hub at the forward end portion and the aft end portion thereof to longitudinally and compressively preload the compressor hub for compressive preloaded retention of the at least one bladed compressor disk between the forward end portion and the aft end portion of the compressor hub;
the turbine comprising a turbine hub having a forward end portion and an aft end portion and at least one bladed turbine disk disposed within the turbine hub between and in engagement with the forward end portion and the aft end portion thereof;
the gas turbine engine rotor further comprising an aft tie shaft independent of the forward tie shaft, the aft tie shaft engaging the compressor hub at the aft end portion thereof;
the aft tie shaft engaging the turbine hub at the aft end portion thereof to longitudinally and compressively preload the turbine hub for compressive retention of the at least one bladed turbine disk between the aft end portion of the turbine hub and the aft end portion of the compressor hub independently of the preloaded retention of the at least one bladed compressor disk within the compressor hub;
wherein the forward end portion of the turbine hub is coupled to the aft end portion of the compressor hub for transmission of rotational driving torque from the turbine to the compressor;
wherein the forward end portion of the turbine hub is coupled to the aft end portion of the compressor hub by a bolted coupling therewith;
wherein the aft tie shaft at a forward end thereof is provided with a radially outwardly extending coupling flange and each of the forward end portion of the turbine hub and the aft end portion of the compressor hub is provided with a radially inwardly extending coupling flange, the radially inwardly extending coupling flange of the forward end portion of the turbine hub and the radially inwardly extending coupling flange of the aft end portion of the compressor hub abut one another and are coupled together by bolts which extend through each of the radially outwardly extending coupling flange of the forward end of the aft tie shaft, the radially inwardly extending coupling flange of the forward end portion of the hub of the turbine, and the radially inwardly extending coupling flange of the aft end portion of the hub of the compressor.

15. The gas turbine engine rotor of claim 14 wherein the aft end portion of the compressor hub is provided with a radially inwardly extending flange, the forward tie shaft engaging the forward end portion of the aft tie shaft by abutment of the forward turbine are coupled together by bolts which extend through the each of the radially outwardly extending coupling flange of the forward end of the aft tie shaft, the radially inwardly extending coupling flange of the forward end portion of the hub of the turbine, and the radially inwardly extending coupling flange of the aft end portion of the hub of the compressor.

* * * * *